US010306341B2

(12) United States Patent
Reitsma et al.

(10) Patent No.: US 10,306,341 B2
(45) Date of Patent: May 28, 2019

(54) METHOD AND APPARATUS FOR DETERMINING SENSOR DATA RELIABILITY AT AN INCIDENT SCENE FOR REAL-TIME AND POST-INCIDENT PROCESSING

(71) Applicant: MOTOROLA SOLUTIONS, INC., Chicago, IL (US)

(72) Inventors: Katrin Reitsma, Chicago, IL (US); Francesca Schuler, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/635,939

(22) Filed: Jun. 28, 2017

(65) Prior Publication Data

US 2019/0007757 A1    Jan. 3, 2019

(51) Int. Cl.
| | |
|---|---|
| *H04Q 9/00* | (2006.01) |
| *G06N 3/02* | (2006.01) |
| *G06Q 50/26* | (2012.01) |
| *H04N 7/18* | (2006.01) |

(52) U.S. Cl.
CPC ............ *H04Q 9/00* (2013.01); *G06Q 50/265* (2013.01); *H04N 7/18* (2013.01); *H04Q 2209/84* (2013.01)

(58) Field of Classification Search
None
See application file for complete search history.

(56) References Cited

U.S. PATENT DOCUMENTS

| | | | |
|---|---|---|---|
| 4,710,750 A | | 12/1987 | Johnson |
| 4,857,912 A | | 8/1989 | Everett, Jr. et al. |
| 5,486,811 A | | 1/1996 | Wehrle et al. |
| 6,065,119 A | | 5/2000 | Sandford, II et al. |
| 6,078,050 A | | 6/2000 | Castleman |
| 8,116,243 B2 | | 2/2012 | Zhiying et al. |
| 8,977,373 B2 | | 3/2015 | Felty et al. |
| 8,995,946 B2 | | 3/2015 | Miller |
| 9,225,793 B2 | | 12/2015 | Dutta et al. |
| 9,306,965 B1 | | 4/2016 | Grossman et al. |
| 9,373,014 B1 | | 6/2016 | Mehranfar |
| 9,794,755 B1 | | 10/2017 | South et al. |
| 9,818,136 B1 * | | 11/2017 | Hoffberg ............ G06Q 30/0207 |

(Continued)

FOREIGN PATENT DOCUMENTS

| | | |
|---|---|---|
| EP | 2424196 A1 | 2/2012 |
| WO | WO-2016209689 A1 | 12/2016 |

OTHER PUBLICATIONS

Notice of Allowance dated Nov. 16, 2017, by USPTO, re U.S. Appl. No. 15/635,706.

(Continued)

*Primary Examiner* — John F Mortell
(74) *Attorney, Agent, or Firm* — Perry + Currier, Inc.

(57) ABSTRACT

An electronic processor is configured to determine sensor data reliability at an incident scene for real-time and post-incident processing. The electronic processor receives primary sensor data from a primary data source, retrieves secondary data associated with the primary sensor data, calculates a reliability index for the primary sensor data using the secondary data; compares the reliability index to a threshold and one of executes a particular action and applies a particular policy as a function of the comparison.

21 Claims, 5 Drawing Sheets

(56) References Cited

U.S. PATENT DOCUMENTS

| | | |
|---|---|---|
| 9,915,947 B1* | 3/2018 | LaForge ............... G05D 1/0077 |
| 2005/0172047 A1 | 8/2005 | Pettey |
| 2006/0230270 A1 | 10/2006 | Goffin |
| 2008/0042825 A1 | 2/2008 | Denny et al. |
| 2009/0043920 A1 | 2/2009 | Kuris et al. |
| 2012/0115494 A1 | 5/2012 | Christensen et al. |
| 2014/0167954 A1 | 6/2014 | Johnson et al. |
| 2015/0145696 A1 | 5/2015 | Seo et al. |
| 2015/0254463 A1 | 9/2015 | Ryhorchuk et al. |
| 2015/0319176 A1 | 11/2015 | Yahalom et al. |
| 2016/0150366 A1 | 5/2016 | Miller et al. |
| 2016/0379473 A1 | 12/2016 | Bharti et al. |
| 2017/0105057 A1 | 4/2017 | Stamatakis et al. |
| 2017/0358151 A1 | 12/2017 | Koons et al. |
| 2018/0037193 A1 | 2/2018 | Penilla et al. |
| 2018/0137403 A1* | 5/2018 | Kaur ................... G06F 11/1608 |

OTHER PUBLICATIONS

Ibarguengoytia, P. H., Sucar, L. E., & Vadera, S. (2001). Real time intelligent sensor validation. IEEE Transactions on Power Systems, 16(4), 770-775.

USPTO, Notice of Allowance and Fee(s) Due, dated Apr. 18, 2018, re U.S. Appl. No. 15/897,828.

ISA/EP, International Search Report and Written Opinion, dated Aug. 20, 2018, re PCT International Patent Application No. PCT/US2018/035363.

ISA/EP, International Search Report and Written Opinion, dated Aug. 10, 2018, re PCT International Patent Application No. PCT/US2018/034860.

ISA/EP, International Search Report and Written Opinion, dated Aug. 20, 2018, re PCT International Patent Application No. PCT/US2018/035367.

* cited by examiner

| ROW | SENSOR DATA 202 | DATA SOURCE 204 | DATA VALIDATION 206a | DATA VALIDATION 206b | ... | DATA VALIDATION 206n |
|---|---|---|---|---|---|---|
| 1 | WEAPON FIRED | FIREARM SENSOR 104 | ACCELEROMETER ON VIDEO DEVICE DETECTS A RECOIL 104L | ACCELEROMETER ON SMART WATCH DETECTS A RECOIL 104a | | RADIO RECORDS "SHOTS FIRED" IN PUSH-TO-TALK COMMUNICATION 104e |
| 2 | WEAPON DRAWN | HOLSTER SENSOR 104j | VIDEO DEVICE 104d | INCIDENT FROM CAD 109 | | |
| 3 | HEART RATE BELOW A THRESHOLD | BIOMONITOR SENSOR 104k | "MAN DOWN" ALERT FROM LMR RADIO 104m | VIDEO DEVICE 104d | | |
| 4 | HOTSPOT DETECTED | VIDEO DEVICE IN IR MODE 104L | VIDEO DEVICE IN IR MODE 104d | | | |
| ... | | | | | | |
| n | | | | | | |

FIG. 2

METHOD AND APPARATUS FOR DETERMINING SENSOR DATA RELIABILITY AT AN INCIDENT SCENE FOR REAL-TIME AND POST-INCIDENT PROCESSING

BACKGROUND OF THE INVENTION

During an incident, sensor data may be uploaded to a central repository. The sensor data may include public safety sensor data transmitted from devices in area networks associated with the incident. For example, the public safety sensor data may include sensor data transmitted from devices in a personal area network (for example, sensor data transmitted from devices used by a public safety responder), sensor data transmitted from devices in a vehicle area network (for example, sensor data transmitted from devices associated with a public safety vehicle) and sensor data transmitted from devices in an incident area network (i.e., sensor data transmitted from devices used by public safety responders within the incident coverage area). The sensor data uploaded to the central repository may also include non-public safety sensor data transmitted from devices in the incident coverage area including, for example, sensor data from surveillance cameras on buildings in the incident coverage area. Examples of sensor data may include data from sensors on wearable devices including belts, smart glasses, and gloves, data from sensors on converged devices, data from personal smart phones, data from firearms sensors, data from holster sensors, data from bio monitors, and data from cameras.

Sensor data received from an incident scene may trigger a real-time action or response and/or may serve as evidence for post-incident forensic analysis. For example, sensor data received from an incident scene may be used to notify a dispatcher, request backup assistance or trigger the recording of a video on a body worn camera. Sensors typically have minimal capabilities and often cannot be monitored as part of traditional infrastructure. As such, data collected from sensors may be compromised, for example, due to technical failure or malicious manipulation.

As the number of sensors increase, during an incident, the public safety responders to the incident may be overloaded with the volume of the uploaded sensor data. During post-incident analysis, forensic analysts may also be overwhelmed by the volume of searchable data in the central repository. In addition, compromised uploaded sensor data may quickly spread through area networks associated with the incident, potentially resulting in consequential responses.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a block diagram of a confirmation table used in accordance with some embodiments.

Figure 1:
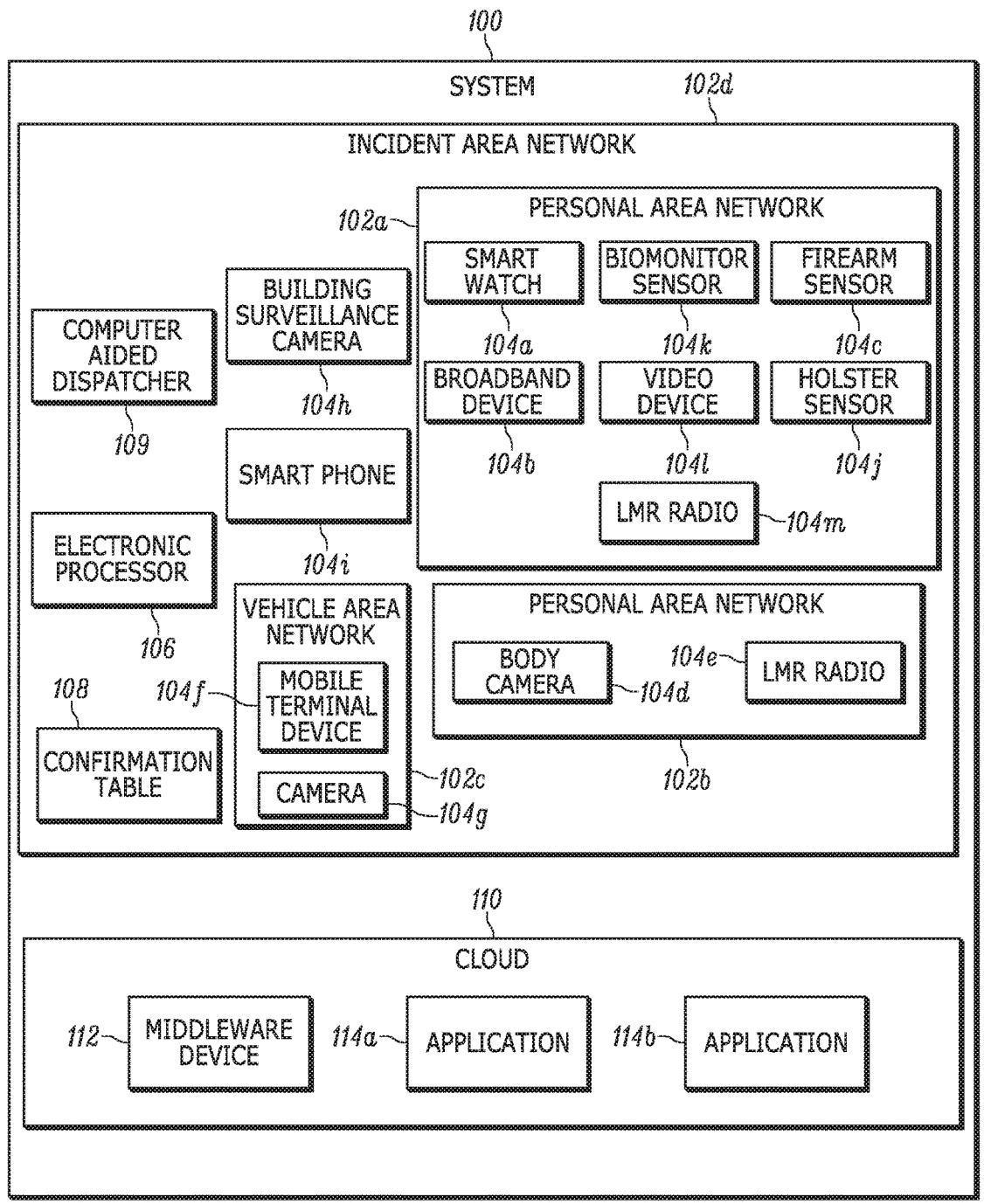
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods for determining sensor data reliability at an incident scene for real-time and post-incident processing. An electronic processor receives primary sensor data from a primary data source, retrieves secondary data associated with the primary sensor data, calculates a reliability index for the primary sensor data using the secondary data, compares the reliability index to a threshold and one of executes a particular action and applies a particular policy as a function of the comparison.

FIG. 1 is a block diagram of a system used in accordance with some embodiments. System 100 may include one or more area networks 102 (i.e., networks 102a-102d) each of which is associated with an incident. The area networks may include, for example, personal area networks 102a and 102b (which can comprise body area network), a vehicle area network 102c, and/or an incident area network 102d which includes networks 102a, 102b and 102c. Devices 104a-104l in networks 102 may include sensors and are configured to transmit sensor data to an electronic processor 106 in incident area network 102d. Devices 104a-104l may be associated with public safety sources or non-public safety sources.

Electronic processor 106 is communicatively coupled to a confirmation table 108 and is configured to access information stored in confirmation table 108 to validate sensor data obtained from one or more of the devices 104a-104l to be uploaded to an evidentiary repository (not shown but possibly stored in cloud 110 or in a location on system 100) and determine a relative reliability of the uploaded sensor data. In an embodiment, electronic processor 106, confirmation table 108 and a computer aided dispatcher 109 may be located outside of incident area network 102d and may be possibly stored in cloud 110 (i.e., distributed) but may be communicatively coupled to each other and to devices 104a-104l in incident area network 102d. Electronic processor 106 may also be implemented in computer aided dispatcher 109 or may alternatively be implemented in a communication device located in one of the networks 102a, 102b and 102c. In addition, devices 104, 106 and 109 may also be communicatively coupled with device 112 and/or applications 114a-114b in cloud 110.

Computer aided dispatcher 109 is configured to direct resources including devices 104, 106 and 112 and/or application 114a-114b to an incident. Computer aided dispatcher 109 comprises a device which includes a memory that stores data associated with an incident. In some implementations, the device of computer aided dispatcher 109 includes a processor and a communication interface configured to communicate with the electronic processor 106 and communication devices 104a-104l in an incident area and middleware device 112 in cloud 110. Device 112 may, for example, transmit information received from devices 104, 106 and 109 to applications 114 in cloud 110, wherein data processed by applications 114 maybe subsequently transmitted to devices 104, 106 and 109.

FIG. 2 is a block diagram of a confirmation table 108 used in accordance with some embodiments. In accordance with some embodiment, confirmation table 108 may be maintained in a computing device (not shown) which includes a memory that stores confirmation table 108. In some implementations, the device of confirmation table 108 includes a processor and a communication interface configured to one or more of: provision the fields of confirmation table 108 and communicate with the electronic processor 106.

Each of rows 1-n in confirmation table 108 includes a sensor data field 202, a data source field 204, and one or more data validation fields 206 (i.e., data validation fields 206a-206n). Sensor data field 202 includes sensor data (also referred to herein as primary sensor data) associated with a specific event; data source field 204 includes a data source of the primary sensor data (also referred to herein as a primary data source); and data validation fields 206 include secondary data or other data sources for confirming an event associated with the primary sensor data.

The one or more of the primary sensor data stored in sensor data field 202, the data source stored in data source field 204 and the associated validation data stored in data validation fields 206 may be stored in confirmation table 108 using the device of confirmation table 108. For example, one or more of the fields of confirmation table 108 may be updated to store sensor data associated with one or more of devices 104a-104l when one or more of devices 104a-104l is assigned to one or more of networks 102a-102d and prior to the sensor data being transmitted from one or more of devices 104a-104l. In some embodiments, the device of confirmation table 108 may also update the fields of confirmation table 108 when sensor data is transmitted from one or more of the devices 104a-104l to be uploaded to the evidentiary repository. For example, the device of the confirmation table 108 may receive primary sensor data such as weapon fire data from fire arm sensor 104c and may update the data in the respective fields 202 and 204 of the confirmation table 108 with the weapon fire data. In addition, the device of the confirmation table may receive additional sensor data, for example, accelerometer sensor data or video recordings from one or more other devices within incident area 102d. The device of the confirmation table 108 may further check whether the additional sensor data received from the one or more other devices correspond to or is associated with the weapon fire data stored in sensor data field 202. For example, the device of the confirmation table 108 may further check whether or not the additional sensor data is received from devices within a predefined proximity as the device including the fire arm sensor 104c or in the same network as the device including the fire arm sensor 104c. If the additional data correspond to or is associated with the data stored in the respective fields 202 and 204 of the confirmation table 108, the device of the confirmation table may update data validation fields 206 associated with respective fields 202 and 204 to include the additional sensor data.

When one or more of the devices 104a-104l transmits sensor data created at a first time to be uploaded to the evidentiary repository, electronic processor 106 receives the sensor data from the primary data source, (i.e., from one of devices 104a-104l), uses the sensor data to look up the primary sensor data in confirmation table 108 and retrieves a corresponding row in confirmation table 108. Electronic processor 106 uses information in corresponding data validation fields 206 to retrieve the secondary data from the primary data source and/or a different data source (also referred to herein as a secondary data source). The primary and secondary data sources may be the same or different sensors operating within the same or different networks, domains, and/or organizations. The secondary data may be retrieved from an evidence repository or from one or more secondary data sources. Electronic processor 106 is configured to filter the secondary data with a time window (referred to herein as an initial timestamp), wherein the initial timestamp is a time period including the first time during which an event associated with the primary sensor data occurred. Electronic processor 106 uses the initial timestamp, including the first time, to filter the retrieved secondary data and electronic processor 106 may only retain the secondary data created within the initial timestamp.

Electronic processor 106 uses the retained secondary data to validate the primary sensor data. Electronic processor 106 is also configured to calculate a reliability index for the primary sensor data as a function of sensor properties of the primary data source and any secondary data sources identified from associated data validation fields 206. Examples of the sensor properties may include the primary and/or secondary sensor data, a level of hardware security (for example, a Trusted Execution Environment (TEE), a hardware-backed key store, a Federal Information Processing Standard (FIPS) validated crypto module and/or secure boot) of the primary source and/or secondary source, a level of operating system security (for example, an operating system version, a patch level, certain enabled security features or disabled vulnerable features (for example, open access or third party applications)) of the primary source and/or secondary source, a sensor integrity status, a sensor accuracy level or specification, ownership of sensor data (for example, whether or not the secondary data is also from the primary data source), a domain associated with the sensor data (for example, whether or not the primary and/or secondary sensor data is transmitted from a device in a public safety domain or a non-public safety domain) and a type of area network associated with the secondary data. Electronic processor 106 may receive the sensor properties from the primary data source and any secondary data sources identified from associated data validation fields 206. Based on the sensor properties, electronic processor 106 may use the secondary data to increase or decrease a value of the calculated reliability index. For example, if a secondary data source identified from an associated data validation field 206 has a relatively high level of hardware security (for example, a FIPS validated crypto module), and if secondary data associated with that secondary source is retained and used to validate the primary sensor data, electronic processor 106 may increase a value of a calculated reliability index for the primary sensor data based on the relatively high sensor property of the secondary data source. Electronic processor 106 may assign a numeric value or a category, for example, high, medium or low to the calculated reliability index.

Electronic processor 106 is further configured to create a first digital signature by digitally signing the primary sensor data, a primary source identifier and the calculated reliability index. The primary source identifier may include information of the type of device a sensor generating the primary sensor data is embedded in (for example, a weapon or phone) or an owner or operator of the sensor generating the primary sensor data. In some embodiments, the first digital signature may be calculated over both the primary sensor data and the reliability index or over a hash of the primary sensor data and the reliability index to securely tie them together. Electronic processor 106 may also include the initial timestamp, data and/or identifiers from the secondary data in the first digital signature. Electronic processor 106 is configured to upload the digitally signed data associated with the first digital signature to the evidentiary repository and the digitally signed data may be transmitted to one or more of devices 104, 109 and 112 and applications 114. Devices 104, 109 and 112 and applications 114 receiving the digitally signed data may verify the first digital signature to authenticate the signer and check the integrity of the primary sensor data and the reliability index.

Electronic processor 106 is also configured to compare the calculated reliability index to a predefined threshold and one of execute a particular action and apply a particular policy as a function of the comparison. In an embodiment, electronic processor 106 may map the calculated reliability index to associated policies. For example, if the calculated reliability index is above the predefined threshold, electronic processor 106 may map the calculated reliability index to policies associated with a higher reliability index. Examples of policies for the higher reliability index may include uploading one or more of the primary sensor data and the digitally signed data associated with the first digital signature to the evidentiary repository; disseminating the signed information associated with the first digital signature to communication devices associated with specific public safety responders or applications to trigger real-time action; creating a second digital signature over the primary sensor data, the primary source identifier, the calculated reliability index, the initial timestamp, data and/or identifiers from the secondary data and uploading the second digital signature to the evidentiary repository; notifying specific public safety responders or applications that evidentiary level data is available for use; and using the primary sensor data to trigger real-time actions such as a call for backup or to send information to dispatcher 109.

If the calculated reliability index is below a predefined threshold, electronic processor 106 may map the calculated reliability index to policies associated with a lower reliability index. An example of a policy for the lower reliability index may include disseminating the primary sensor data via, for example, direct mode to devices within a given vicinity of the primary data source.

Figure 3:
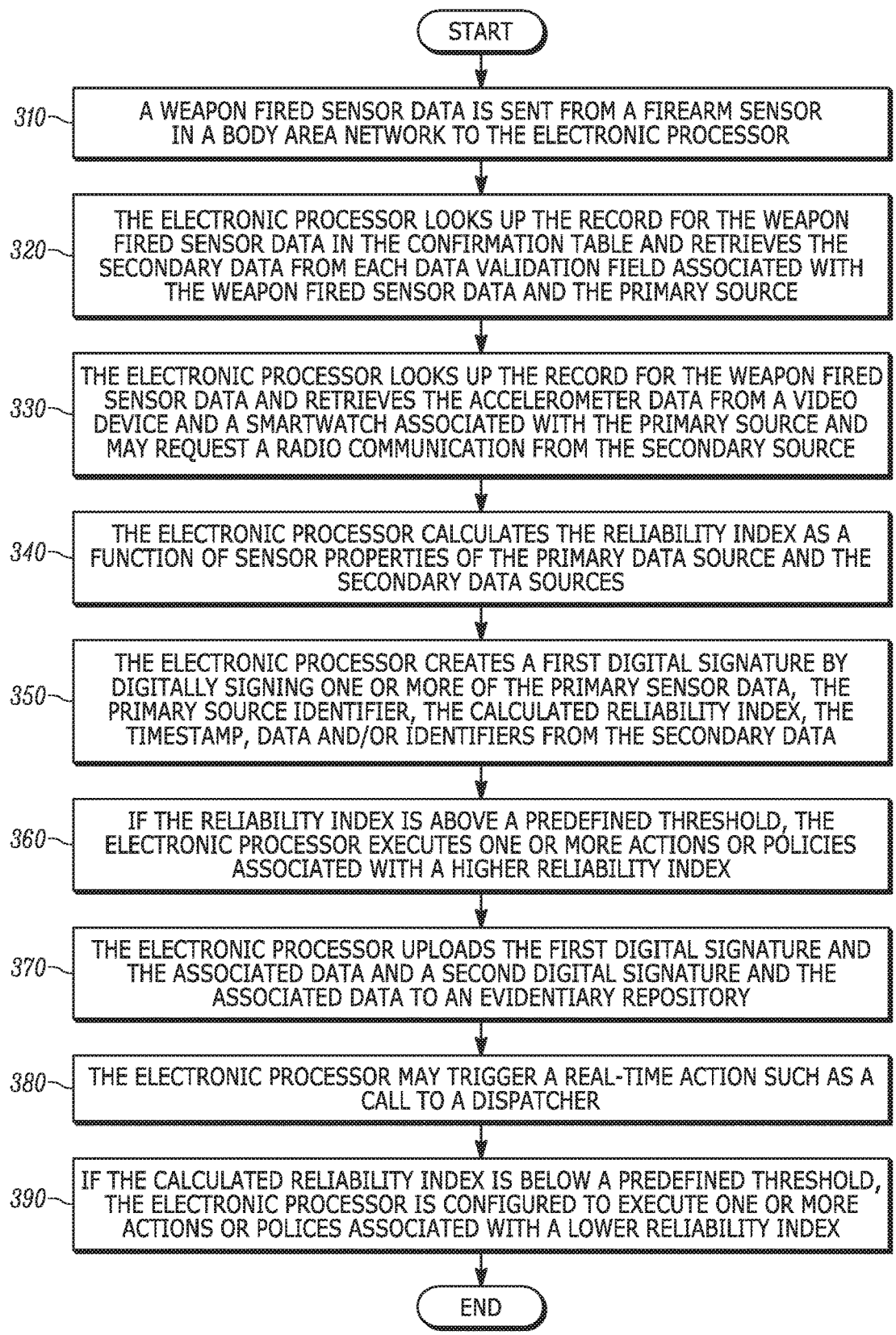
FIG. 3 is a flow diagram implemented in accordance with some embodiments.

FIG. 3 is a flow diagram implemented in accordance with some embodiments. Considering FIG. 3 using FIGS. 1 and 2, at 310, a weapon fired sensor data is sent from a firearm sensor 104c, in body area network 102a, to electronic processor 106. At 320, electronic processor 106 looks up a record for the weapon fired sensor data in the confirmation table 108 (for example, in row 1 of the confirmation table 108) and retrieves the secondary data from each data validation field 206 associated with the weapon fired sensor data and the primary source. Using the example shown in FIG. 2, at 330, electronic processor 106 looks up the record for the weapon fired sensor data (for example, in row 1 of the confirmation table 108) and retrieves the accelerometer data from a video device 104l and a smartwatch 104a associated with the primary source and may request a radio communication from the secondary source, for example, from radio 104e in body/personal area network 102b. At 340, electronic processor 106 calculates the reliability index as a function of sensor properties of the primary data source and the secondary data sources. At 350, electronic processor 106 creates a first digital signature by digitally signing one or more of the primary sensor data, the primary source identifier, the calculated reliability index, the timestamp, data and/or identifiers from the secondary data. At 360, if the reliability index is above a predefined threshold, electronic processor 106 is configured to execute one or more actions or policies associated with a higher reliability index. For example, electronic processor 106 may transmit in real-time, the sensor data, the primary source and the reliability index to middleware device 112 for further transmission to applications 114a and 114b. Application 114a may, in real-time display, the sensor data, the primary source and the reliability index on devices 104b and 104f. At 370, electronic processor 106 uploads the first digital signature and the associated data and a second digital signature and the associated data to an evidentiary repository. At 380, electronic processor 106 may trigger a real-time action such as a call to dispatcher 109. At 390, if the calculated reliability index is below a predefined threshold, electronic processor 106 is configured to execute one or more actions or policies associated with a lower reliability index.

Figure 4:
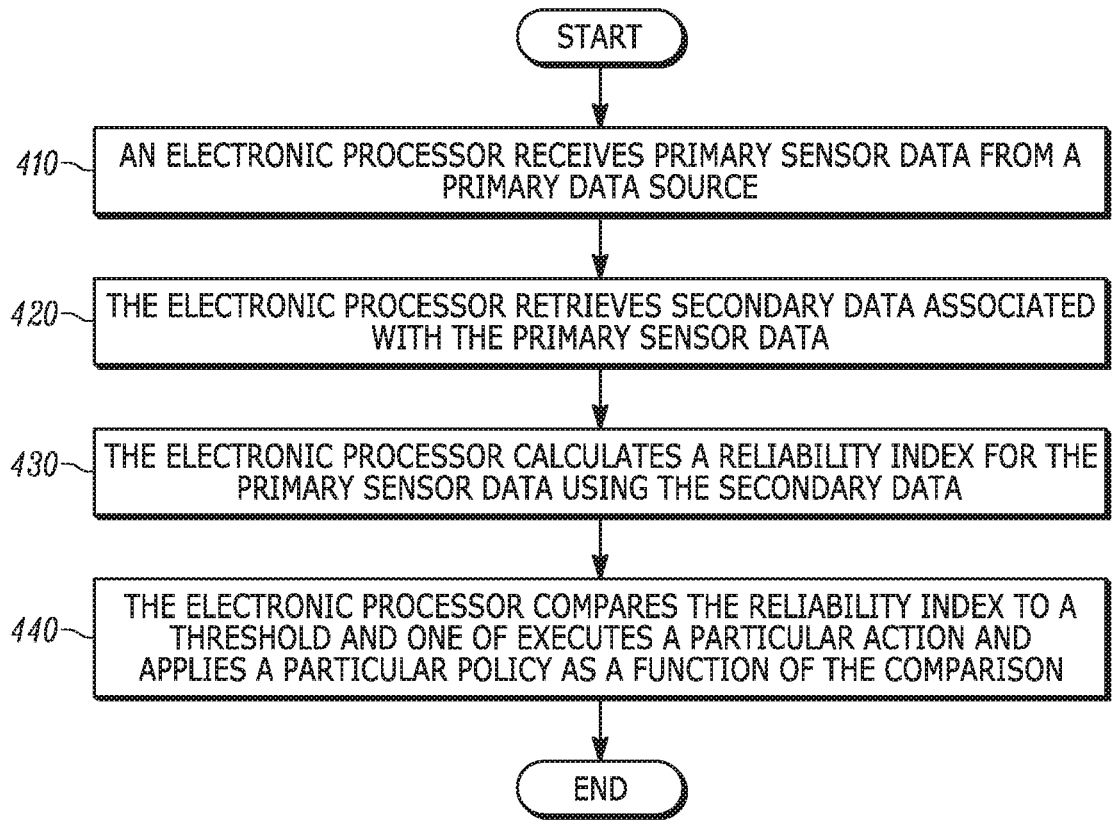
FIG. 4 is another flow diagram implemented in accordance with some embodiments.

FIG. 4 is another flow diagram implemented in accordance with some embodiments. At 410, an electronic processor, for example, electronic processor 106, receives primary sensor data from a primary data source. At 420, the electronic processor retrieves secondary data associated with the primary sensor data. At 430, the electronic processor calculates a reliability index for the primary sensor data using the secondary data. At 440, the electronic processor compares the reliability index to a threshold and one of executes a particular action and applies a particular policy as a function of the comparison.

Figure 5:
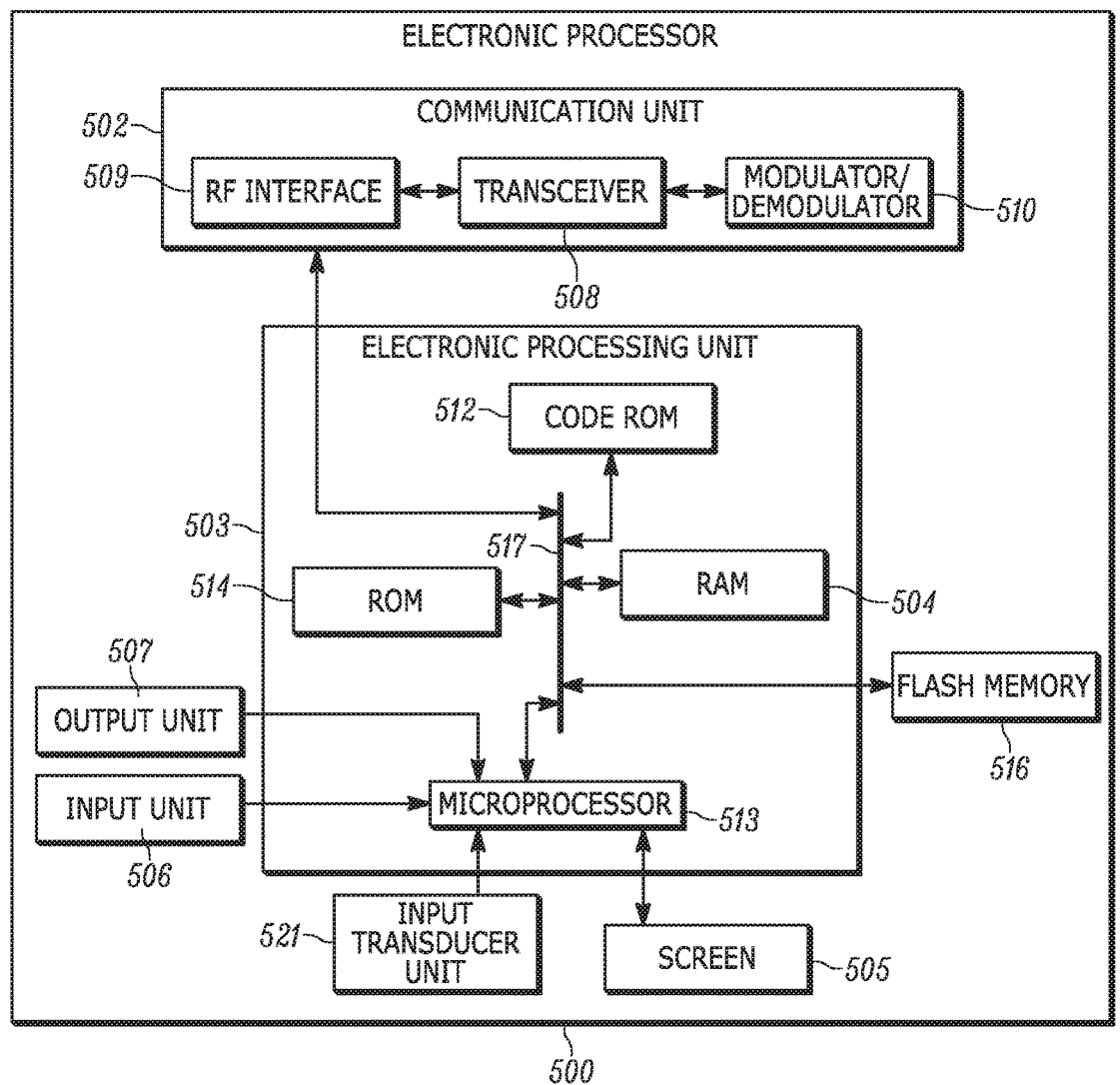
FIG. 5 is a block diagram of an electronic processor used in accordance with some embodiments.

FIG. 5 is a block diagram of the electronic processor 500, such as electronic processor 106, used in accordance with some embodiments. Electronic processor 500, for example, may include a communications unit 502 coupled to a common data and address bus 517 of an electronic processing unit 503. Electronic processor 500 may also include an input unit (e.g., keypad, pointing device, etc.) 506, an output transducer unit (e.g., speaker) 507, an input transducer unit (e.g., a microphone) (MIC) 521, and a display screen 505, each coupled to be in communication with the electronic processing unit 503.

The electronic processing unit 503 may include a code read-only memory (ROM) 512 for storing data for initializing system components of electronic processor 500. The electronic processing unit 503 may further include a microprocessor 513 coupled, by the common data and address bus 517, to one or more memory devices, such as a read only memory (ROM) 514, a random access memory (RAM) 504, and/or a static memory or flash memory 516. One or more of ROM 514, RAM 504 and flash memory 516 may be included as part of electronic processing unit 503 or may be separate from, and coupled to, the electronic processing unit 503.

Communications unit 502 may include an RF interface 509 configurable to communicate with network components and other user equipment within its communication range. Communications unit 502 may include one or more broadband and/or narrowband transceivers 508, such as an Long Term Evolution (LTE) transceiver, a Third Generation (3G) (3GGP or 3GGP2) transceiver, an Association of Public Safety Communication Officials (APCO) Project 25 (P25)

transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 502 may also include one or more local area network or personal area network transceivers perhaps operating in accordance with an IEEE 802.11 standard (e.g., 802.11a, 802.11b, 802.11g), or a Bluetooth transceiver. The transceivers may be coupled to a combined modulator/demodulator 510. The one or more memory devices 512, 514 and 516 are configured to store non-transitory computer-executable instructions to perform a set of functions such as one or more of the steps set forth in FIGS. 3-4.

The electronic processor 106 therefore executes real-time policies, wherein policies may be created around notifying specific responders or applications that evidentiary level data is available for use; policies may be created around using evidentiary level data to trigger real-time actions, for example, calling for backup assistance; and policies may be triggered based on a reliability index value in comparison with a predefined threshold. The electronic processor 106 may also execute policies based on the value of the reliability index. For example, data with a lower reliability index value may be only disseminated locally (via direct mode), whereas data with a higher reliability index value may be disseminated to talk groups and/or a dispatcher. In another example, data with a higher reliability index value may be sent to a dispatcher and data with a lower reliability index value may be sent to a mapping application. Sensor data from a sensor with calculated reliability index value that is higher than or equal to the predefined threshold may be used in forensic analysis. Forensic tools may use the reliability index from signed data to prioritize evidence associated with an incident.

Embodiments of the methods executed by electronic processor 106 may be used to reduce the amount of recorded data where, for example, only data with a higher reliability index value may be uploaded to the evidence repository. Embodiments of the methods executed by the electronic processor may also prevent faulty data from spreading in networks and from triggering responses and may improve forensic analysis of sensor data.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, by an electronic processor, primary sensor data from a primary data source;
   retrieving, by the electronic processor, secondary data associated with the primary sensor data;
   calculating, by the electronic processor, a reliability index for the primary sensor data using the secondary data; and
   comparing, by the electronic processor, the reliability index to a threshold and one of executing a particular action and applying a particular policy as a function of a comparison, such that:
   when the reliability index is above the threshold, one or more of: disseminating the primary sensor data to one or more of talkgroups and a computer aided dispatcher associated with public safety responders; notifying specific public safety responders or applications that evidentiary level data is available for use; and using the primary sensor data to trigger real-time actions associated with the public safety responders.

2. The method of claim 1, wherein the secondary data is data associated with an event and the secondary data is retrieved from one or more of the primary data source and a secondary data source.

3. The method of claim 1, wherein the retrieving comprises looking up, in a confirmation table, one or more secondary data sources associated with the primary sensor data from the primary data source, and retrieving the secondary data from the one or more secondary data sources.

4. The method of claim 3, further comprising filtering the secondary data with a time window including a first time during which the primary sensor data was created.

5. The method of claim 1, wherein the calculating comprises calculating the reliability index for the primary sensor data as a function of sensor properties of the primary data source and any secondary data sources associated with the primary sensor data.

6. The method of claim 5, wherein the sensor properties include one or more of the primary sensor data, the secondary data, a level of hardware security of the primary data source, a level of operating system security of the primary data source, a level of hardware security of a secondary data source, a level of operating system security of the secondary data source, a sensor integrity status, a sensor accuracy level, ownership of the primary sensor data and the secondary data, a domain associated with the primary sensor data, a domain associated with the secondary data, a type of area network associated with the primary sensor data and a type of area network associated with the secondary data.

7. The method of claim 1, wherein the calculating comprises using the secondary data to increase or decrease a value of the reliability index.

8. The method of claim 1, further comprising, when the reliability index is above the threshold: digitally signing, by the electronic processor, the primary sensor data, a primary source identifier and the reliability index and uploading a digitally signed data associated with a first digital signature to an evidentiary repository.

9. The method of claim 1, further comprising, when the reliability index is above the threshold: mapping the reliability index to one or more policies associated with a higher reliability index,
   wherein the one or more policies associated with the higher reliability index includes policies for one or more of:
   uploading, to an evidentiary repository, one or more of the primary sensor data and digitally signed data associated with a first digital signature;
   disseminating the digitally signed data, the reliability index, and a first time during which the primary sensor data was created, to communication devices associated with specific public safety responders or applications;
   notifying the specific public safety responders or the applications that the evidentiary level data is available for use; and
   using the primary sensor data to trigger the real-time actions associated with the public safety responders.

10. The method of claim 1, wherein the secondary data is generated from a different type of sensor than a sensor generating the primary sensor data.

11. The method of claim 1, further comprising validating the primary sensor data with the secondary data filtered with a timestamp including a first time during which the primary sensor data was created.

12. An electronic processor comprising:
    a memory storing non-transitory computer-executable instructions; and
    a transceiver; and
    wherein the electronic processor configured to perform a set of functions in response to executing the computer-executable instructions, the set of functions including:
    receiving primary sensor data from a primary data source;
    retrieving secondary data associated with the primary sensor data;
    calculating a reliability index for the primary sensor data using the secondary data; and
    comparing the reliability index to a threshold and one of executing a particular action and applying a particular policy as a function of a comparison, such that:
    when the reliability index is above the threshold, one or more of: disseminating the primary sensor data to one or more of talkgroups and a computer aided dispatcher associated with public safety responders; notifying specific public safety responders or applications that evidentiary level data is available for use; and using the primary sensor data to trigger real-time actions associated with the public safety responders.

13. The electronic processor of claim 12, wherein the secondary data is data associated with an event and the secondary data is retrieved from one or more of the primary data source and a secondary data source.

14. The electronic processor of claim 12, wherein the retrieving comprises:
    looking up, in a confirmation table, one or more secondary data sources associated with the primary sensor data from the primary data source;
    retrieving the secondary data from the one or more secondary data sources; and
    filtering the secondary data with a time window including a first time during which the primary sensor data was created.

15. The electronic processor of claim 12, wherein the calculating comprises calculating the reliability index for the primary sensor data as a function of sensor properties of the primary data source and any secondary data sources associated with the primary sensor data.

16. The electronic processor of claim 12, wherein the calculating comprises using the secondary data to increase or decrease a value of the reliability index.

17. The electronic processor of claim 12, further configured to digitally sign the primary sensor data, a primary source identifier and the reliability index and upload a digitally signed data associated with a first digital signature to an evidentiary repository.

18. The method of claim 1, further comprising: when the reliability index is below the threshold, disseminating the primary sensor data to devices, associated with the public safety responders, within a given vicinity of the primary data source.

19. The electronic processor of claim 12, wherein the set of functions further include: when the reliability index is below the threshold, disseminating the primary sensor data to devices, associated with the public safety responders, within a given vicinity of the primary data source.

20. The method of claim 1, wherein the retrieving comprises looking up, in a confirmation table, one or more secondary data sources associated with the primary sensor data from the primary data source, and retrieving the secondary data from the one or more secondary data sources, wherein the secondary data is generated from a different type of sensor than a sensor generating the primary sensor data.

21. The electronic processor of claim 12, wherein the retrieving comprises looking up, in a confirmation table, one or more secondary data sources associated with the primary sensor data from the primary data source, and retrieving the secondary data from the one or more secondary data sources, wherein the secondary data is generated from a different type of sensor than a sensor generating the primary sensor data.

\* \* \* \* \*